(12) United States Patent
Kani

(10) Patent No.: US 9,013,744 B2
(45) Date of Patent: Apr. 21, 2015

(54) IMAGE FORMING SYSTEM AND INFORMATION PROCESSING APPARATUS

(71) Applicant: Kyocera Document Solutions Inc., Osaka (JP)

(72) Inventor: Mamoru Kani, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/949,362

(22) Filed: Jul. 24, 2013

(65) Prior Publication Data

US 2014/0036307 A1 Feb. 6, 2014

(30) Foreign Application Priority Data

Jul. 31, 2012 (JP) .................. 2012-169874

(51) Int. Cl.
G06F 3/12 (2006.01)
(52) U.S. Cl.
CPC ............ *G06F 3/1204* (2013.01); *G06F 3/1255* (2013.01); *G06F 3/1257* (2013.01); *G06F 3/1285* (2013.01)
(58) Field of Classification Search
USPC ........................................................ 358/1.15
See application file for complete search history.

(56) References Cited

U.S. PATENT DOCUMENTS

| 2006/0230261 | A1  | 10/2006 | Yoshimura et al. |
| 2009/0036056 | A1* | 2/2009  | Oshima et al. ............... 455/41.3 |
| 2009/0284791 | A1* | 11/2009 | Osada .......................... 358/1.15 |
| 2010/0157346 | A1  | 6/2010  | Waki |
| 2012/0092696 | A1* | 4/2012  | Nakano ........................ 358/1.14 |

FOREIGN PATENT DOCUMENTS

| JP | 2006-293771 A | 10/2006 |
| JP | 2010-129043 A | 6/2010 |
| JP | 2011-152717 A | 8/2011 |

* cited by examiner

*Primary Examiner* — Jerome Grant, II
(74) *Attorney, Agent, or Firm* — Morgan, Lewis & Bockius LLP

(57) ABSTRACT

In a case where a set value, which is used during a time of job execution by an image forming apparatus that is different from the use-target image forming apparatus, is selected as a set value to be set into a use-target image forming apparatus, based on set value identification information, an information processing apparatus of an image forming system identifies a set value corresponding to the selected set value from set values for a set item of the use-target image forming apparatus, and transmits setting information, which is for changing a current set value of the use-target image forming apparatus to the identified set value, to the use-target image forming apparatus.

12 Claims, 8 Drawing Sheets

| | IMAGE FORMING APPARATUS 100a | IMAGE FORMING APPARATUS 100b | . . . . . . . |
|---|---|---|---|
| SET ITEM A | 4in1,2in1 | 2in1 | . . . . . . . |
| SET ITEM B | MONOCHROME | MONOCHROME, COLOR | . . . . . . . |
| . . . . . | . . . . . | . . . . . | |

| | IMAGE FORMING APPARATUS 100a | IMAGE FORMING APPARATUS 100b | · · · · · · · · |
|---|---|---|---|
| SET ITEM A | 4in1,2in1 | 2in1 | · · · · · · · · |
| SET ITEM B | MONOCHROME | MONOCHROME, COLOR | · · · · · · · · |
| ⋮ | ⋮ | ⋮ | |

IMAGE FORMING SYSTEM AND INFORMATION PROCESSING APPARATUS

INCORPORATION BY REFERENCE

This application is based on and claims the benefit of priority from Japanese Patent Application No. 2012-169874 filed on Jul. 31, 2012, the contents of which are hereby incorporated by reference.

BACKGROUND

The present disclosure relates to an image forming system and an information processing apparatus.

Conventionally, an image forming apparatus connectable to networks such as an internet and the like is known. For example, an image forming system is known, in which an image forming apparatus and a server are connectable to each other via a network.

In such image forming system, it is possible to save setting information for changing and setting a set value for a set item that the image forming apparatus has. According to this, for a user, if setting information corresponding to a desired set value is saved beforehand, a set value of the image forming apparatus is changed and set to the desired set value by only transmitting the setting information from the user to the image forming apparatus; therefore, it becomes unnecessary to perform an input operation for changing and setting the set value of the image forming apparatus to the desired set value, and convenience is good.

For example, there is a case where an image forming system is structured by connecting a plurality of image forming apparatuses to a sever in a communicating manner. In this case, there is a case where the user wants to set again a set value (desired set value) set in an image forming apparatus used in the past into an image forming apparatus that is now a use target. But, if the image forming apparatus used in the past and the current use-target image forming apparatus are different from each other in specification (e.g., maker), there is a case where the desired set value able to be set in the image forming apparatus used in the past is unable to be set in the current use-target image forming apparatus. Accordingly, the user has to perform an input operation for performing a setting change of a set value of the current use-target image forming apparatus such that it is possible to obtain the same result as a result obtained when a job is executed by means of the desired set value, which is inconvenient.

The present disclosure is intended to solve the above problems, and it is an object of the present disclosure to provide an image forming system and an information processing apparatus that are able to reduce operations performed by a user to improve convenience for the user when executing a job (setting of a set value).

SUMMARY

To achieve the above object, an image forming apparatus according to the present disclosure includes a plurality of image forming apparatuses and an information processing apparatus. The information processing apparatus is connected to the plurality of image forming apparatuses in a communicating manner and transmits setting information, which is for changing a current set value for a set item of a use-target image forming apparatus of the plurality of image forming apparatuses to a selected set value, to the use-target image forming apparatus. Besides, the information processing apparatus includes a storage portion and a process portion. And, the storage portion stores set value identification information which is information indicating a corresponding relationship between set values for a set item of each of the plurality of image forming apparatuses, and used to identify a set value, which corresponds to the selected set value, from set values for the set item of the use-target image forming apparatus. In a case where a set value, which is used during a time of job execution by an image forming apparatus that is different from the use-target image forming apparatus, is selected as a set value to be set into the use-target image forming apparatus, based on the set value identification information, the process portion that identifies a set value corresponding to the selected set value from the set values for the set item of the use-target image forming apparatus, and transmits information, which is for changing the current set value of the use-target image forming apparatus to the identified set value, to the use-target image forming apparatus as the setting information.

DETAILED DESCRIPTION (Overall Structure of Image Forming System)

Figure 1:
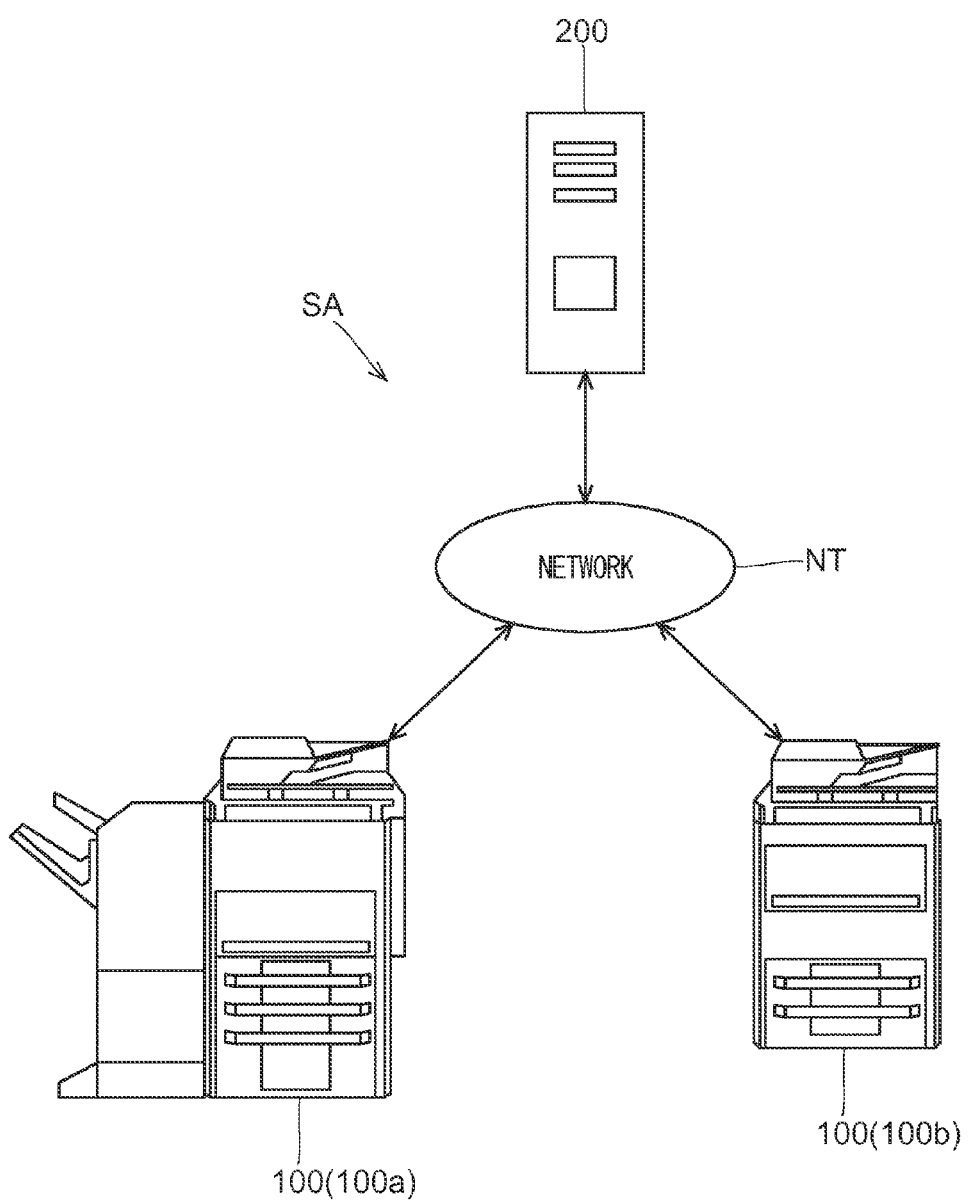
FIG. 1 is a schematic view of an image forming system according an embodiment of the present disclosure.

As shown in FIG. 1, an image forming system SA according to an embodiment of the present disclosure includes at least a plurality of image forming apparatuses 100 and a server 200. The image forming apparatus 100 and the server 200 each have a communication function. Because of this, it is possible for the image forming apparatus 100 and the server 200 to communicate with each other. For example, the image forming apparatus 100 and the server 200 are connected to each other over a network NT such as an internet or the like to be able to communicate with each other. In the meantime, the server 200 corresponds to an "information processing apparatus" according to the present disclosure.

The number of image forming apparatuses 100 included in the image forming system SA is not especially limited if the number is 2 or more. But, at least one image forming apparatus 100 of the plurality of image forming apparatuses 100 is different from the other image forming apparatuses 100 in specification (e.g., maker). FIG. 1 shows, as an example, a case where the number of image forming apparatuses 100 is two (image forming apparatuses 100a and 100b).

Besides, the image forming apparatus 100 may be a multi-function machine, a copy machine, a printer apparatus, or a facsimile apparatus. For example, both the image forming apparatuses 100a and 100b may be a multi-function machine, or a combination may be employed, in which the image forming apparatus 100a is a multi-function machine and the other image forming apparatus 100b is a copy machine. In other words, it is possible to change the type of the image forming apparatus 100 included in the image forming system SA.

In the meantime, a mobile information terminal 300 (see FIG. 9 and FIG. 10) may be added to the image forming system SA, and in the case of adding the mobile information terminal 300, the server 200 may be removed. Details are described later.

Next, an example of a structure of the image forming apparatus 100 is described. In the meantime, in the following description, it is assumed that the image forming apparatus 100 is a multi-function machine. In other words, according to the image forming apparatus 100 described hereinafter, it is possible to execute a plurality of kinds of jobs such as a copy job, a scan job, a fax job and the like.

Figure 2:
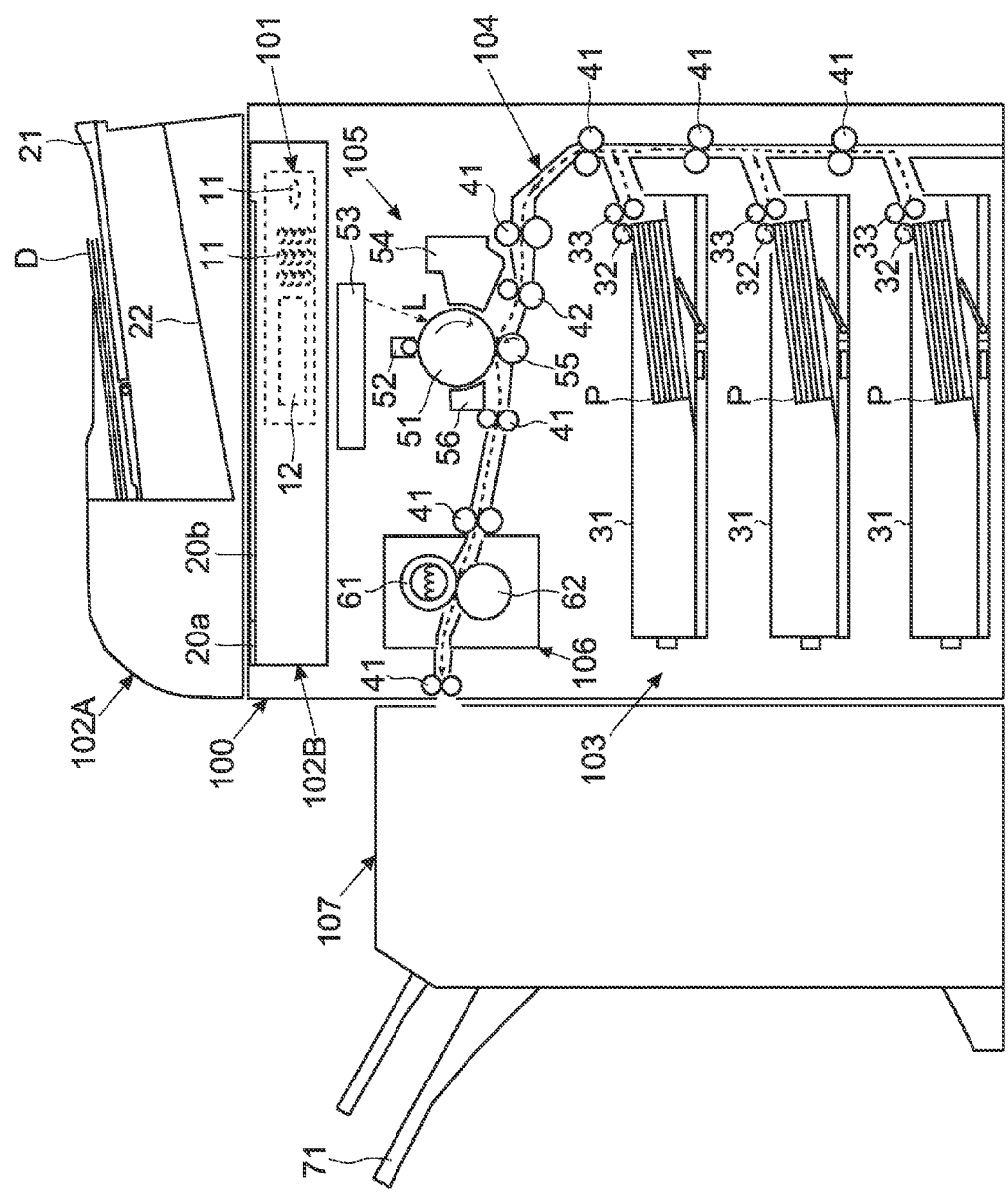
FIG. 2 is a view showing an example of an image forming apparatus included in the image forming system shown in FIG. 1.

As shown in FIG. 2, the image forming apparatus 100 includes: an operation panel 101; a document conveyance portion 102A; an image read portion 102B; a paper sheet supply portion 103; a paper sheet conveyance portion 104; an image forming portion 105; a fix portion 106; a post-process portion 107 and the like. And, a mechanism portion, which includes the paper sheet portion 103, the paper sheet conveyance portion 104, the image forming portion 105 and the fix portion 106, defines a print portion 108 (see FIG. 3). In the meantime, the operation panel 101 corresponds to an "operation display portion" of the present disclosure.

The operation panel 101 is disposed on an apparatus front side. The operation panel 101 has hard keys 11 such as a ten key pad for receiving a numerical input and a start key for receiving an instruction for starting job execution. Besides, the operation panel 101 has a liquid crystal display portion 12 which is provided with a touch panel on its surface. The liquid crystal display portion 12 displays a screen on which a soft key for receiving an input operation from a user and a message are disposed. And, the touch panel of the liquid crystal display portion 12 is disposed to detect a soft key (soft key touched by the user via the touch panel) designated by the user.

Here, there are many set items (called a "function" in some cases) whose set values are able to be changed and set for execution of various jobs. Because of this, the operation panel 101 receives an instruction, from the user, for performing a setting change of a set value for execution of various jobs. For example, when receiving an instruction for performing a setting change of a set value from the user, the operation panel 101 displays a setting screen (not shown). And, the user operates the operation panel 101 to perform the setting change of the set value.

As set items whose set values are able to be changed and set when executing a copy job, there are: paper sheet selection; size reduction/enlargement; concentration; both sides/division; page integration; sorting/classification; document size; document set direction; document sizes mingled; paper sheet ejection destination; staple; document image quality; eco-print; tint adjustment; color balance; sharpness; base color adjustment; offset prevention; chroma; binding margin; continuous reading; automatic image rotation; job end imparting; file name input; preferential printing; black/white inversion; mirror image; interrupting copy and the like. In the meantime, as to jobs other than the copy job, there are also many set items whose set values are able to be changed and set for execution of the jobs.

For example, after selecting a desired set item, the user changes a current set value to a desired set value. As examples, as to "both sides/division," "single side→both sides," "both sides→single side" and the like correspond to set values; as to "page integration," "4in1," "2in1" and the like correspond to set values. Besides, as to "concentration," "thick," "plain," "thin" and the like correspond to set values. In the meantime, as to "concentration," "size reduction/enlargement" and the like, it is also possible to set the set value to an arbitrary value. Besides, as to "black/white inversion," "mirror image (function to print a document as if reflected in a mirror)" and the like, two words of "setting" and "not-setting" correspond to set values. In the meantime, as to a scan job and a fax job, a recipient address and the like also correspond to set values.

The document conveyance portion 102A is mounted in an openable/closable manner on a rotary shaft (not shown) that is disposed as a fulcrum on an apparatus rear side of the image read portion 102B. The document conveyance portion 102A pulls out a document D set in a document set tray 21, sends the document above a conveyance-read contact glass 20a, and ejects it onto a document ejection tray 22. Besides, also the document conveyance portion 102A has a function to depress the document D placed on a placement-read contact glass 20b.

The image read portion 102B reads the document D to generate image data. Although not shown, the image read portion 102B is provided with optical members such as an exposure lamp, a mirror, a lens, an image sensor and the like. And, the image read portion 102B shines light onto the document D that passes though the conveyance-read contact glass 20a or the document D that is placed on the placement-read contact glass 20b, and applies A/D conversion to an output value from the image sensor that receives reflected light from the document D to generate the image data. In this way, it is possible to print an image based on the image data obtained by the read operation (scan) that is applied to the document D by the image read portion 102B. Besides, it is also possible to store the image data obtained by the scan.

The paper sheet supply portion 103 has a plurality of cassettes 31 that store paper sheets P and supply the paper sheets P stored in the plurality of cassettes 31 to the paper sheet conveyance portion 104. The paper sheet supply portion 103 is provided with a pickup roller 32 that pulls out the stored paper sheet P and a pair of separation rollers 33 that curbs double conveyance of the paper sheets P.

The paper sheet conveyance portion 104 conveys the paper sheet P in the image forming apparatus 100. Specifically, the paper sheet P supplied from the paper sheet supply portion 103 is conveyed by the paper sheet conveyance portion 104 to pass through the image forming portion 105 and the fix portion 106 in this order. The paper sheet conveyance portion 104 is provided with a plurality of pairs of conveyance rollers 41 for conveying the paper sheet P. Further, a pair of registration rollers 42 are also provided, which makes the paper sheet P wait before the image forming portion 105 and sends the paper sheet to the image forming portion 105 synchronizing with a timing.

The image forming portion 105 forms a toner image based on the image data and transfers the toner image onto the paper sheet P. The image forming portion 105 includes: a photosensitive drum 51; an electrification apparatus 52; an exposure apparatus 53; a development apparatus 54; a transfer roller 55; a cleaning apparatus 56 and the like.

In the toner image forming process and the toner image transfer process, first, the photosensitive drum 51 is driven to rotate, and a surface of the photosensitive drum 51 is electrified to a predetermined potential by the electrification apparatus 52. Besides, the exposure apparatus 53 outputs a light beam L based on the image data to scan the surface of the photosensitive drum 51. In this way, an electrostatic latent image is formed on the surface of the photosensitive drum 51. The development apparatus 54 supplies toner to the electrostatic latent image formed on the surface of the photosensitive drum 51 to develop the electrostatic latent mage.

The transfer roller 55 rotatably comes into tight contact with the surface of the photosensitive drum 51. Further, a predetermined voltage is applied to the transfer roller 55. In this state, the pair of registration rollers 42, synchronizing with a timing, conveys the paper sheet P between the transfer roller 55 and the photosensitive drum 51. In this way, the toner image on the surface of the photosensitive drum 51 is transferred onto the paper sheet P. And, when the transfer process of the toner image ends, the cleaning apparatus 56 removes toner and the like remaining on the surface of the photosensitive drum 51.

The fix portion 106 heats and pressurizes the toner image transferred to the paper sheet P to fix the toner mage. The fix portion 106 includes a fix roller 61 that incorporates a heat source and a pressure roller 62 that is pressurized against the fix roller 61. And, the paper sheet P, to which the toner image is transferred, passes between the fix roller 61 and the pressure roller 62 to be heated and pressurized. In this way, the toner image is fixed to the paper sheet P and the printing is completed.

The post-process portion 107 receives the printed paper sheet P from the fix portion 106, and performs post-processes such as a classification process, a staple process, a punch process and the like. And, after applying the post processes to the printed paper sheet P, the post-process portion 107 ejects the paper sheet P onto an ejection tray 71.

Next, an example of a hardware structure of the image forming apparatus 100 is described.

Figure 3:
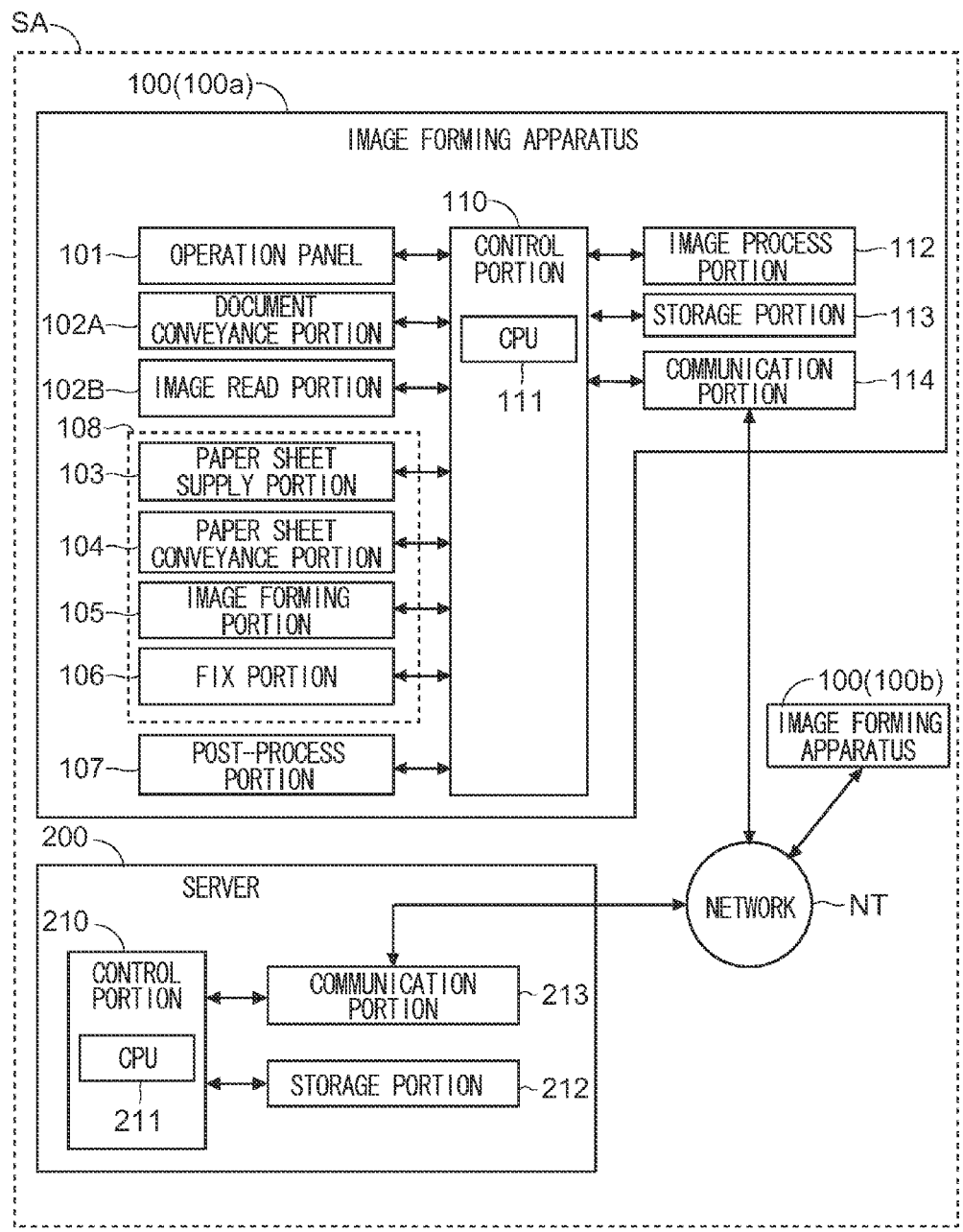
FIG. 3 is a view showing an example of a hardware structure of an image forming apparatus and an information processing apparatus included in the image forming system shown in FIG. 1.

As shown in FIG. 3, the image forming apparatus 100 includes a control portion 110 that has a CPU 111 which is a central processing unit. The control portion 110 is connected to an image process portion 112 and a storage portion 113. The image process portion 112 is composed of an ASIC dedicated to the image process, a memory and the like, and applies various image processes (enlargement/reduction, concentration change, data format conversion and the like) to the image data. The storage portion 113 is composed of a ROM, a RAM, a HDD and the like; and for example, a control program and control data necessary for execution of various jobs are stored in the ROM, and the control program and the control data are deployed in the RAM.

Besides, the control portion 110 is connected to: the operation panel 101; the document conveyance portion 102A; the image read portion 102B; the paper sheet supply portion 103; the paper sheet conveyance portion 104; the image forming portion 105; the fix portion 106; and the post-process portion 107. And, based on the control program and control data stored in the storage portion 113, the control portion 110 performs overall control, display control, image process control, drive control of a motor that rotates various rotary bodies, and the like.

Further, the control portion 110 is connected to a communication portion 114. The communication portion 114 receives an instruction from the control portion 110, communicates with the server 200 to perform transmission/reception of information. In the meantime, the communication protocol is not especially limited, and communication via the network NT such as an internet or the like may be performed, or the apparatuses may be connected to each other over a cable and the like. For example, when a job is executed, the communication portion 114 receives an instruction from the control portion 110, and transmits use history information (file name, job execution date and time, size, file type, a set value used during a time of job execution and the like) indicating a use history to the server 200. At this time, thumbnail image data may be transmitted.

In the meantime, in an image forming system SB (see FIG. 9) composed of the plurality of image forming apparatuses 100, the server 200 and the mobile information terminal 300, the use history information is transmitted to at least one of the server 200 and the mobile information terminal 300. Besides, in an image forming system SC (see FIG. 10) composed of the plurality of image forming apparatuses 100 and the mobile information terminal 300, the use history information is transmitted to the mobile information terminal 300.

Next, an example of a hardware structure of the server 200 is described.

As shown in FIG. 3, the server 200 includes a control portion 210 that has a CPU 211. In the meantime, the control portion 210 corresponds to a "process portion" of the present disclosure. The control portion 210 is connected to a storage portion 212 and a communication portion 213. The storage portion 212 stores various control programs and control data. The communication portion 213 is connected to the network NT and communicates with the image forming apparatus 100 via the network NT.

Besides, when the use history information is transmitted from the image forming apparatus 100, the control portion 210 instructs the communication portion 213 to obtain the use history information. And, the control portion 210 makes the storage portion 212 store the use history information obtained by the communication portion 213 and manages the use history of the image forming apparatus 100.

(Transmission of Setting Information from Server to Image Forming Apparatus)

By only selecting a piece of use history information stored in the server 200, the user can change the current set value of a use-target image forming apparatus 100 to a set value used during a time of job execution by the image forming apparatus 100 indicated by selected piece of the use history information. For example, if a piece of use history information stored in the server 200 is selected by the user, setting information, which is for changing the current set value of the use-target image forming apparatus 100 to the selected set value (set value used during the time of job execution by the image forming apparatus 100 indicated by the piece of use history information), is transmitted from the server 200 to the use-target image forming apparatus 100. Because of this, for the user, it becomes unnecessary to change the current set values of the use-target image forming apparatus 100 one by one for the execution of a job; therefore, input operations decrease and the convenience is good.

But, if the image forming apparatus 100 (e.g., image forming apparatus 100b), which is different from the image forming apparatus 100 (e.g., image forming apparatus 100a) indicated by the use history information in specification, is targeted for use, there is a case where it is impossible to apply the set value, as it is, during the time of job execution by the image forming apparatus 100a indicated by the use history information as a set value of the use-target image forming apparatus 100b. For example, even if both the "4 in1" and "2 in1" can be set for the "page integration" in the image forming apparatus 100a, there is a case where only the "2 in1" can be set (the setting of the "4 in1" is impossible) for the "page integration" in the image forming apparatus 100b. Or, there is also a case where an output result (concentration) obtained when the set value for the "concentration" is set at "3" in the image forming apparatus 100a is different from an output result (concentration) obtained when the set value for the "concentration" is set at "3" in the image forming apparatus 100b. In the meantime, even if the image forming apparatuses 100a and 100b are the same type of machines as each other, there is also a case where the output results (concentration and tint) are different from each other because of time-dependent change.

Accordingly, in the present embodiment, in a case where the set value used during the time of job execution by the image forming apparatus 100 different from the use-target image forming apparatus 100 is selected as a set value to be set into the use-target image forming apparatus 100, the control portion 210 of the server 200 changes the selected value to a set value that can be set into the image forming apparatus 100.

Figures 4, 5:
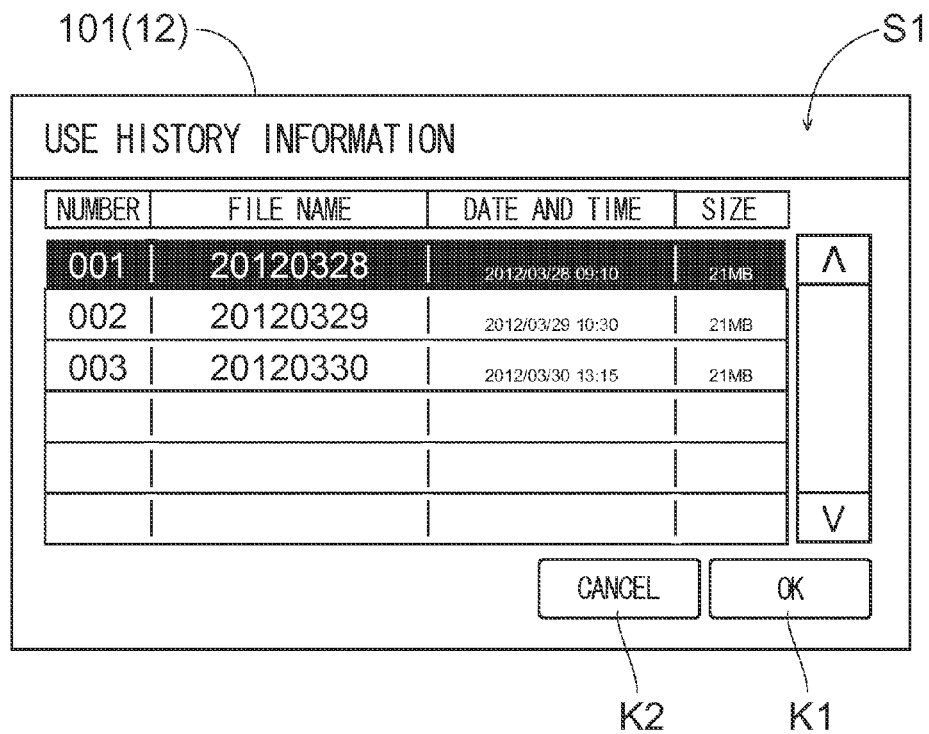
FIG. 4 is a view showing an example of a screen that is displayed when an instruction for selecting a set value in the image forming system shown in FIG. 1.
FIG. 5 is a view showing an example of set value identification information used for a set value identification process in the image forming system shown in FIG. 1.

Specifically, first, the user selects a piece of use history information; but, it is the image forming apparatus 100 that receives the instruction for selecting a piece of use history information. When receiving the instruction for selecting a piece of use history information from the user, the control portion 110 of the image forming apparatus 100 instructs the operation panel 101 to display text information as options which indicates content (file name, job execution data and time, size and the like) of the use history information in a visually identifiable manner. For example, the operation panel 101 displays a selection screen 51 as shown in FIG. 4. The selection screen 51 represents a list that indicates the content of the use history information in text. And, the user selects, from the list represented on the selection screen 51, an option that indicates the date and time when a job was executed by means of a desired set value, and pushes down an "OK" key K1. In the meantime, when a "cancel" key K2 is pushed down, the selection is lifted. Thereafter, the control portion 110 instructs the communication portion 114 to transmit the selected piece of use history information to the server 200.

Upon receiving the selected piece of use history information, the control portion 210 of the server 200 determines whether the image forming apparatus 100 indicated by the selected piece of use history information is different from the use-target image forming apparatus 100 or not. In other words, the control portion 210 determines whether the set value used during the time of job execution by the image forming apparatus 100 different from the use-target image forming apparatus 100 is selected as the set value to be set into the use-target image forming apparatus 100 or not. And, if the image forming apparatus 100 indicated by the piece of use history information is different from the use-target image forming apparatus 100, the control portion 210 changes, based on set value identification information T (see FIG. 5), the selected set value (set value used during the time of job execution by the image forming apparatus 100 indicated by the piece of use history information) to a set value applicable to the use-target image forming apparatus 100.

The set value identification information T is, for example, a table as shown in FIG. 5, and is stored in the storage portion 212 of the server 200. The set value identification information T is information (information obtained by dividing the set values for the set items of each of the plurality of image forming apparatuses 100 into groups based on types) that indicates a corresponding relationship among the set values for the set items of each of the plurality of image forming apparatuses 100 and information that identifies, from the set values for the set items of the use-target image forming apparatus 100, a set value that corresponds to a selected set value (set value used during the time of job execution by the image forming apparatus 100 indicated by a piece of use history information). Hereinafter, a set value for the "page integration" as a set item is specifically described as an example.

For example, it is assumed that both the "4in1" and "2in1" can be set in the image forming apparatus 100a and only the "2in1" (the setting of "4in1" is impossible) can be set in the image forming apparatus 100b. In this case, a set item (called a set item A) is defined, which has a set range of all set values that give the same result (inclusive of an approximate result) as the result that is obtained when a job is executed with the "4in1" or "2in1" set as the set value, and the "4in1" and "2in1" able to be set into the image forming apparatus 100a are made to correspond to the set item A, while the "2in1" able to be set into the image forming apparatus 100b is made to correspond to the set item A. In other words, the "4in1" and "2in1", which are the set values able to be set into the image forming apparatus 100a, and the "2in1", which is the set value able to be set into the image forming apparatus 100b are classified into the same group. In the meantime, FIG. 5 illustrates another example in which "monochrome", that is, a set value able to be set into the image forming apparatus 100a, and "monochrome" and "color", that is, set values able to be set into the image forming apparatus 100b, are classified into the same group.

And, when changing the selected set value (set value used during the time of job execution by the image forming apparatus 100 indicated by the piece of use history information) to the set value applicable to the use-target image forming apparatus 100, the control portion 210 of the server 200 identifies, based on the set value identification information T, the set value corresponding to the selected set value from the set values for the set item of the use-target image forming apparatus 100. In other words, the set value corresponding to the use-target image forming apparatus 100 is identified from the group to which the selected set value belongs. For example, it is assumed that the image forming apparatus 100b is targeted for use and the set value used during the time of job execution by the image forming apparatus 100a is selected as the set value to be set into the image forming apparatus 100b. Here, it is assumed that the "4in1" is selected. In this case, first, the control portion 210 confirms that the "4in1", that is, the set value (selected set value) used during the time of job execution by the image forming apparatus 100a, is made to correspond to the set item A defined by the set value identification information T. Thereafter, the control portion 210 identifies the set value, which is made to correspond to the set item A defined by the set value identification information T, from the set values for the set item of the image forming apparatus 100b. In other words, the set value identified by the control portion 210 is the "2in1."

Thereafter, the control portion 210 of the server 200 instructs the communication portion 213 to transmit the setting information, which is for changing the current set value of the use-target image forming apparatus 100 to the identified set value, to the use-target image forming apparatus 100. In this way, the current set value of the use-target image forming apparatus 100 is changed and set such that the same result (inclusive of an approximate result) as the result that is obtained when a job is executed by means of the set value selected by the user.

Besides, for example, if an output result obtained when the concentration set value for the "concentration" as a set item is set at "3" in the image forming apparatus 100a becomes the substantially same output result obtained when the concentration set value is set at "2" in the image forming apparatus 100b, the concentration set value "3" of the image forming apparatus 100a and the concentration set value "2" of the image forming apparatus 100b may be classified into the same group. Because of this, even in a case where the image forming apparatuses 100a and 100b are the same type of machines as each other; but the output results (concentration and tint) are different from each other because of time-dependent change, the concentration and tint are adjusted and it is possible to approach image quality desired by the user.

In the meantime, in a case where another image forming apparatus is added to the image forming system SA, the control portion 210 of the server 200 updates the set value identification information T stored in the storage portion 212. For example, it is conceivable that information indicating the set items and set values of the added image forming apparatus is obtained by means of Java (registered trademark) to update the set value identification information T.

In the meantime, when performing the set value identification process based on the set value identification information T, if there is no set value corresponding to the selected set value, the control portion 210 of the server 200 identifies a set value alternative to the selected set value.

For example, it is highly likely that the use selecting the "4in1" or "2in1" as the set value to be set into the use-target image forming apparatus 100 wants to reduce the number of output paper sheets as many as possible. Because of this, the "single side→both sides", that is, a set value for the "both sides/division", may be defined beforehand as a set value alternative to the "4in1" and "2in1." According to this, print data for two paper sheets are printed on both sides of a paper sheet; therefore, it is possible to reduce the number of output paper sheets.

Figure 6:
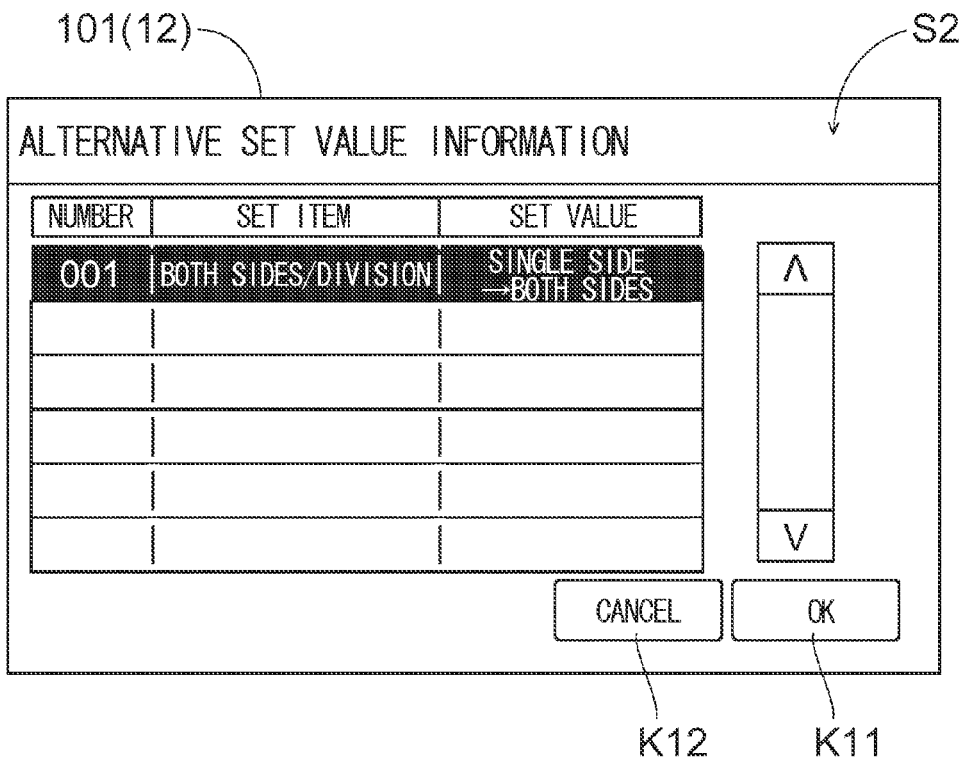
FIG. 6 is a view showing an example of a screen that is displayed when an instruction for deciding an alternative set value in the image forming system shown in FIG. 1.

But there is also a case where the user does not want to execute a job by means of an alternative set value. Because of this, the control portion 110 of the image forming apparatus 100 instructs the operation panel 101 to display an alternative set value, which is indicated by the setting information transmitted from the server 200, in a visually identifiable manner and to receive a decision or non-decision on the alternative set value as a set value to be set actually. Besides, if there is a plurality of alternative set values, the operation panel is made to receive a decision or non-decision on one of the plurality of alternative set values as a set value to be set actually. For example, the operation panel 101 displays a reception screen S2 as shown in FIG. 6. And, in a case where the user permits the execution of a job by means of an alternative set value, the user selects a desired set value and pushes down an "OK" key K11. On the other hand, in a case where the user does not permit the execution of a job by means of an alternative set value, the user pushes down a "cancel" key K12.

Figure 7:
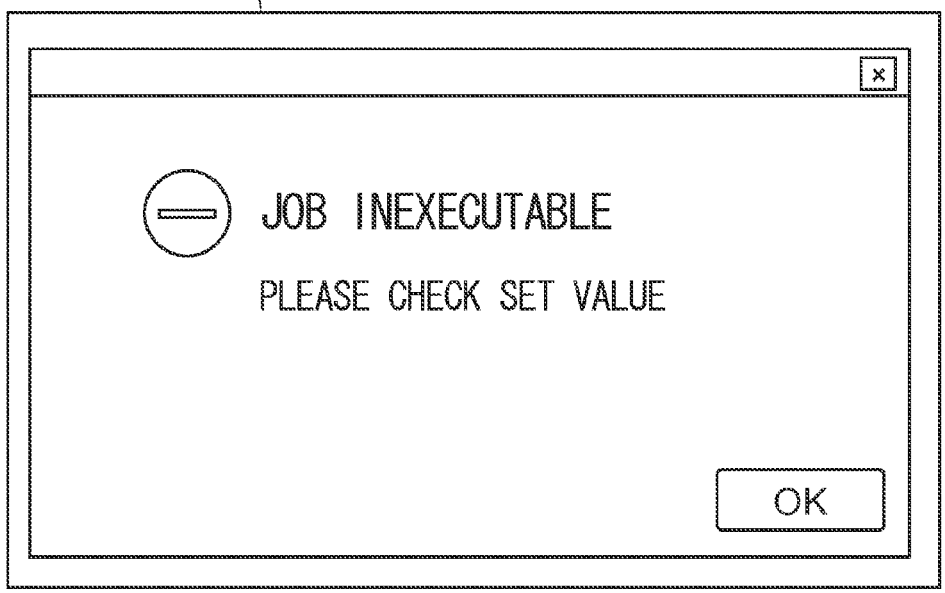
FIG. 7 is a view showing an example of a screen that is displayed when job execution is restricted in the image forming system shown in FIG. 1.

Besides, if the execution of a job by means of the set value (set value identified by the control portion 210 of the server 200) indicated by the setting information transmitted from the server 200 is restricted, before the execution of a job, the control portion 110 of the image forming apparatus 100 imparts that the execution of a job is restricted. For example, in a scan job and a fax job, a recipient address also corresponds to a set value. In other words, the set value indicated by the setting information transmitted from the server 200 includes the recipient address as well. In this case, there is a case where the transmission from the use-target image forming apparatus 100 to a selected recipient address is impossible. At this time, as shown in FIG. 7, the operation panel 101 displays a message that it is impossible to execute a job. Further, a message for prompting confirmation of a set value may be displayed.

(Transmission Flow of Setting Information from Server to Image Forming Apparatus)

Next, a flow of transmitting the setting information from the server 200 to the image forming apparatus 100 is described with reference to a flow chart shown in FIG. 8.

Figure 8:
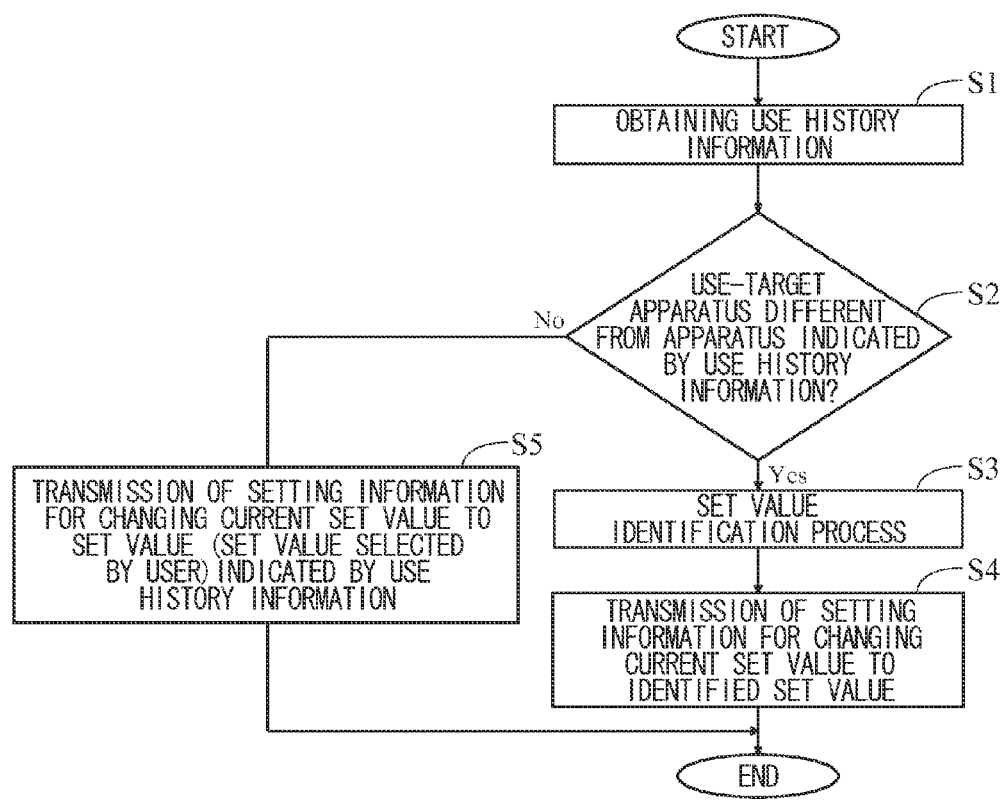
FIG. 8 is a flow chart for describing an operation when setting information is transmitted from an information processing apparatus to an image forming apparatus in the image forming system shown in FIG. 1.

The flow chart shown in FIG. 8 starts when the use history information selected by the user is transmitted from the use-target image forming apparatus 100 to the server 200. And, first, in a step S1, the control portion 210 of the server 200 instructs the communication portion 213 to obtain the selected use history information.

In a step S2, the control portion 210 of the server 200 determines whether the image forming apparatus 100 indicated by the selected use history information is different from the use-target image forming apparatus 100 or not. In other words, it is determined whether the set value used during the time of job execution by the image forming apparatus 100 different from the use-target image forming apparatus 100 is selected or not. In a case where the determination result shows that the image forming apparatus 100 indicated by the selected use history information is different from the use-target image forming apparatus 100, the process goes to a step S3.

Going to the step S3, based on the set value identification information T, the control portion 210 of the server 200 performs a set value identification process for changing the set value used during the time of job execution by the image forming apparatus 100 indicated by the selected use history information to the set value applicable to the use-target image forming apparatus 100. In other words, based on the set value identification information T, the control portion 210 of the server 200 identifies, from the set values for the set item of the use-target image forming apparatus 100, the set value corresponding to the selected set value (set value used during the time of job execution by the image forming apparatus 100 indicated by the use history information). And, in a step S4, the control portion 210 of the server 200 instructs the communication portion 213 to transmit the setting information, which is for changing the current set value of the use-target image forming apparatus 100 to the identified set value, to the use-target image forming apparatus 100.

On the other hand, in the step S2, in a case where the image forming apparatus 100 indicated by the selected use history information is the same as the use-target image forming apparatus 100, the process goes to a step S5. Going to the step S5, the control portion 210 of the server 200 instructs the communication portion 213 to transmit the setting information, which is for changing the current set value of the use-target image forming apparatus 100 to the set value selected by the user, to the use-target image forming apparatus 100.

In the present embodiment, as described above, the storage portion 212 of the server 200 (information processing apparatus) stores the set value identification information T which is the information that indicates the corresponding relationship among the set values for the set items of each of the plurality of image forming apparatuses 100 and the information that identifies, from the set values for the set items of the use-target image forming apparatus 100, the set value that corresponds to the selected set value. Besides, in the case where the set value used during the time of job execution by the image forming apparatus 100 different from the use-target image forming apparatus 100 is selected as the set value to be set into the use-target image forming apparatus 100, based on the set value identification information T, the control portion 210 (process portion) of the server 200 identifies, from the set values for the set items of the use-target image forming apparatus 100, the set value that corresponds to the selected set value, and transmits the setting information, which is for changing the current set value of the use-target image forming apparatus 100 to the identified set value, to the use-target image forming apparatus 100. In other words, in the present embodiment, even if the use selects the set value used during the time of job execution by the image forming apparatus 100 different from the set-target image forming apparatus 100 as the set value to be set into the use-target image forming apparatus 100, the set value selected by the user is changed to the set value applicable to the use-target image forming apparatus 100 and the changed set value is set into the set-target image forming apparatus 100 such that it is possible to obtain the same result (inclusive of an approximate result) as the result obtained when a job is executed by means of the set value selected by the user. According to this, even in the case where the set value used during the time of job execution by the image forming apparatus 100 different from the use-target image forming apparatus 100 is set into the use-target image forming apparatus 100, it becomes unnecessary to perform the input operation for changing the current set value of the use-target image forming apparatus 100 to the desired set value; therefore, the convenience for the user improves.

Besides, in the present embodiment, as described above, the storage portion 212 of the server 200 stores the use history information that indicates the use history of the image forming apparatus 100 of the plurality of image forming apparatuses 100 which executes a job; and by receiving the instruction for selecting the use history information, the image forming apparatus 100 receives that the set value used during the time of job execution by the image forming apparatus 100 indicated by the selected use history information is selected as the set value to be set into the use-target image forming apparatus 100. According to this, in the case where a desired set value is set into the use-target image forming apparatus 100, it is sufficient to select the use history information obtained when executing a job by means of the desired set value; therefore, the convenience for the user improves.

Besides, in the present embodiment, as described above, when the control portion 210 of the server 200 identifies the set value corresponding to the use-target image forming apparatus 100 based on the set value identification information T, if there is no set value corresponding to the selected set value, the control portion 210 of the server 200 identifies the set value alternative to the selected set value. According to this, when it is impossible to change the current set value of the use-target image forming apparatus 100 to the desired set value, it is unnecessary to check the alternative set value; therefore, the convenience for the user improves.

Besides, in the present embodiment, as described above, the image forming apparatus 100 receives a decision or non-decision on the set value alternative to the selected set value as the set value to be set actually. According to this, the user who does not want to execute a job by means of the alternative set value can stop the job; therefore, the convenience is good.

Besides, in the present embodiment, as described above, if the execution of a job by means of the set value identified by the control portion 210 of the server 200 is restricted, the image forming apparatus 100 imparts that the execution of a job by means of the set value identified by the control portion 210 of the server 200 is restricted. According to this, the user can recognize instantly that the execution of a job is restricted, and the convenience is good.

Besides, in the present embodiment, as described above, the control portion 210 of the server 200 obtains, from the image forming apparatus newly added, the information indicating the set items and set values of the image forming apparatus newly added, and updates the set value identification information T. According to this, even if the image forming apparatus is newly added, it is possible to surely perform the set value identification process based on the set value identification information.

It should be considered that the embodiment disclosed this time is an example in all respects and are not limiting. The scope of the present disclosure is not indicated by the above description of the embodiment but by the claims, and all modifications within the scope of the claims and the meaning equivalent to the claims are covered.

For example, in the above embodiment, the case is described, where the plurality of image forming apparatuses 100 and the server 200 compose the image forming system SA; but the mobile information terminal 300 may be added to the image forming system SA. In other words, as shown in FIG. 9, the plurality of image forming apparatuses 100, the server 200 and the mobile information terminal 300 may compose the image forming system SB.

Figure 9:
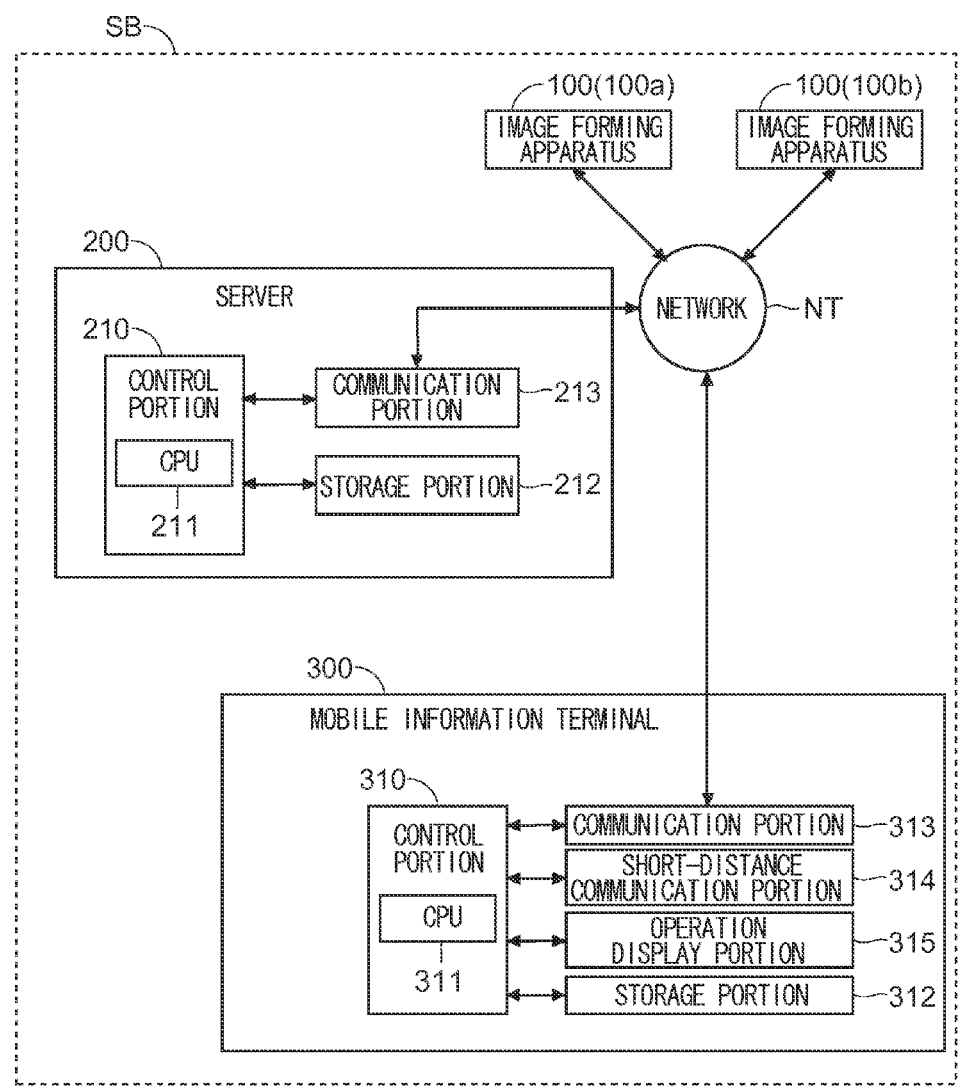
FIG. 9 is a view for describing a structure of an image forming system according to a modification of the present disclosure.

The mobile information terminal 300, as shown in FIG. 9, includes a control portion 310 that has a CPU 311. The control portion 310 is connected to a storage portion 312 that stores a control program and control data, and performs control of each portion that composes the mobile information terminal 300. For example, the control portion 310 performs control of a communication portion 313, a short-distance communication portion 314, and an operation display portion 315.

The communication portion 313 communicates with the nearest base station to allow transmission/reception of information via the network NT. In the meantime, a dialog via the mobile information terminal 300 may be possible by connecting a dialog portion (mike and speaker) to the communication portion 313. Besides, the short-distance communication portion 314 is disposed to perform short-distance communication with the image forming apparatus 100. The operation display portion 315 is a liquid crystal display portion with a touch panel, displays various information, and receives a user's input operation.

Here, the storage portion 312 of the mobile information terminal 300 stores the use history information (file name, job execution date and time, size, file type, set value used during a time of job execution and the like) indicating the use history of the image forming apparatus 100 of the plurality of image forming apparatuses 100 that executes a job. And, the operation display portion 315 of the mobile information terminal 300 receives an instruction for selecting a piece of use history information to receive (receive the instruction for selecting the set value to be set into the use-target image forming apparatus 100) that the set value used during the time of job execution by the image forming apparatus 100 indicated by the selected piece of use history information is selected as the set value to be set into the use-target image forming apparatus 100. Thereafter, the communication portion 312 of the mobile information terminal 300 transmits the selected piece of use history information (information indicating the selected set value) to the server 200.

According to the image forming system SB shown in FIG. 9, for the user, it becomes unnecessary to go near the use-target image forming apparatus 100 when changing the current set value of the use-target image forming apparatus 100 to a desired set value; therefore, the convenience is good.

Figure 10:
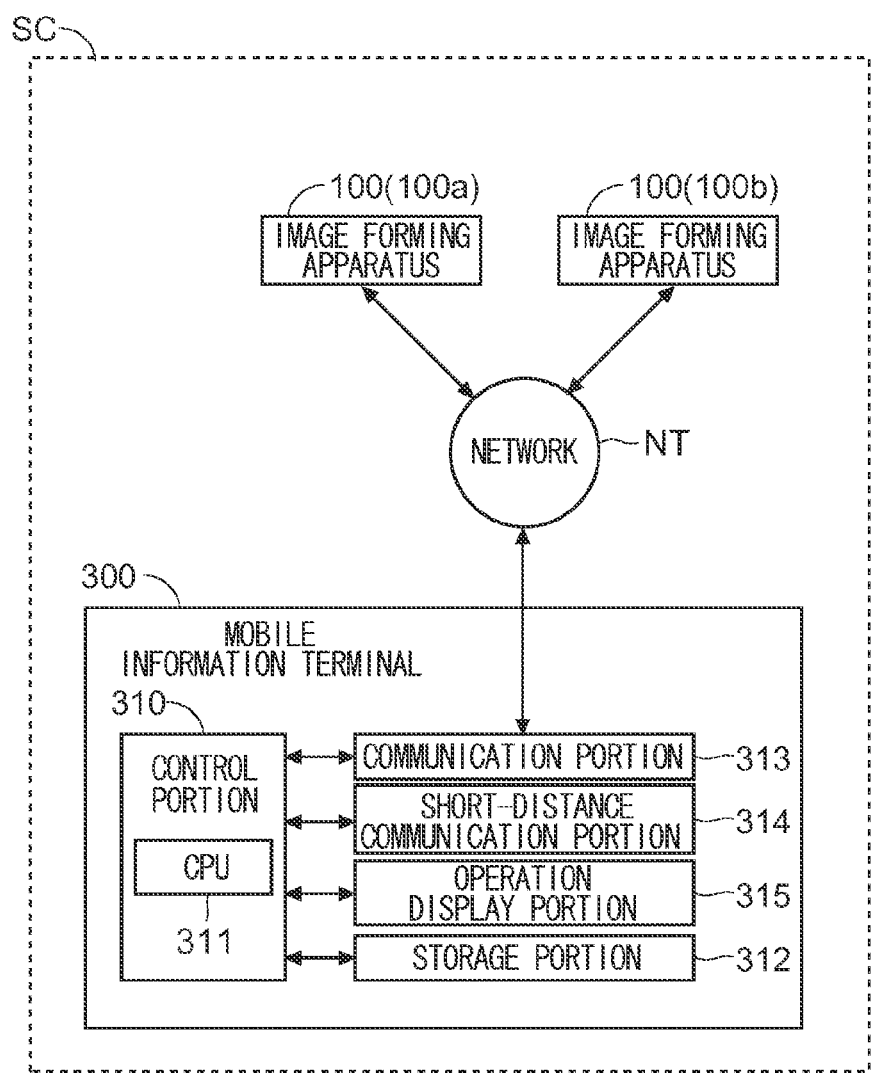
FIG. 10 is a view for describing a structure of an image forming system according to a modification of the present disclosure.

Further, in the image forming apparatus SB shown in FIG. 9, the server 200 may be removed. In other words, as shown in FIG. 10, the plurality of image forming apparatuses 100 and the mobile information terminal 300 may compose the image forming system SC. In this case, the mobile information terminal 300 corresponds to an "information processing apparatus" according to the present disclosure. Besides, the control portion 310 of the mobile information terminal 300 corresponds to the "process portion" of the present disclosure.

According to the image forming system SC shown in FIG. 10, the storage portion 312 of the mobile information terminal 300 stores the set value identification information T (see FIG. 5), and the control portion 310 of the mobile information terminal 300 performs a set value identification process. And, after the set value identification process by the control portion 310 of the mobile information terminal 300, communication is performed between the use-target image forming apparatus 100 and the mobile information terminal 300 by means of the communication portion 313 of the mobile information terminal 300, whereby the setting information is transmitted from the mobile information terminal 300 to the use-target image forming apparatus 100. At this time, it is also possible to perform short-distance communication between the use-target image forming apparatus 100 and the mobile information terminal 300 by means of the short-distance communication portion 314 of the mobile information terminal 300. According to such structure, for the user, it becomes unnecessary to go near the use-target image forming apparatus 100 when changing the current set value of the use-target image forming apparatus 100 to a desired set value; therefore, the convenience is good.

What is claimed is:

1. An image forming system, comprising:
a plurality of image forming apparatuses; and
an information processing apparatus that is connected to the plurality of image forming apparatuses in a communicating manner and transmits setting information, which is for changing a current set value for a set item of a use-target image forming apparatus of the plurality of image forming apparatuses to a selected set value, to the use-target image forming apparatus, wherein
the information processing apparatus includes:
a storage portion that stores set value identification information which is information indicating a corresponding relationship between respective set values for a set item of each of the plurality of image forming apparatuses, and used to identify a set value, which corresponds to the selected set value, from set values for the set item of the use-target image forming apparatus; and
a process portion that in a case where a set value, which is used during a time of job execution by an image forming apparatus that is different from the use-target image forming apparatus, is selected as a set value to be set into the use-target image forming apparatus, based on the set value identification information, identifies a set value corresponding to the selected set value from the set values for the set item of the use-target image forming apparatus, and transmits information, which is for changing the current set value of the use-target image forming apparatus to the identified set value, to the use-target image forming apparatus as the setting information, wherein
the storage portion of the information processing apparatus stores use-history information that indicates a use history of an image forming apparatus of the plurality of image forming apparatuses which executes a job; and
the use-target image forming apparatus or the information processing apparatus receives an instruction for selecting the use history information, thereby receiving a selection of a set value, which is used during a time of job execution by the image forming apparatus indicated by the use history information, as the set value to be set into the use-target image forming apparatus.

2. The image forming system according to claim 1, wherein the plurality of image forming apparatuses each include an operation display portion that displays information and receives an operation input; and
the use-target image forming apparatus, when receiving the instruction for selecting the use history information, makes the operation display portion display text information, which indicates content of the use history information in a visually identifiable manner, as an option.

3. The image forming system according to claim 1, wherein in a case where another image forming apparatus is added to the image forming system, the process portion of the information processing apparatus obtains information, which indicates a set item and a set value of the other image forming apparatus, from the other image forming apparatus and updates the set value identification information.

4. The image forming system according to claim 1, further comprising:
a mobile information terminal that is connected to the plurality of image forming apparatuses and the information processing apparatus in a communicating manner, wherein
the mobile information terminal receives an instruction for selecting the set value to be set into the use-target image forming apparatus, and transmits information, which indicates the selected set value, to the information processing apparatus.

5. An image forming system, comprising:
a plurality of image forming apparatuses; and
an information processing apparatus that is connected to the plurality of image forming apparatuses in a communicating manner and transmits setting information, which is for changing a current set value for a set item of a use-target image forming apparatus of the plurality of image forming apparatuses to a selected set value, to the use-target image forming apparatus, wherein
the information processing apparatus includes:
a storage portion that stores set value identification information which is information indicating a corresponding relationship between respective set values for a set item of each of the plurality of image forming apparatuses, and used to identify a set value, which corresponds to the selected set value, from set values for the set item of the use-target image forming apparatus; and
a process portion that in a case where a set value, which is used during a time of job execution by an image forming apparatus that is different from the use-target image forming apparatus, is selected as a set value to be set into the use-target image forming apparatus, based on the set value identification information, identifies a set value corresponding to the selected set value from the set values for the set item of the use-target image forming apparatus, and transmits information, which is for changing the current set value of the use-target image forming apparatus to the identified set value, to the use-target image forming apparatus as the setting information, wherein the process portion of the information processing apparatus, when identifying the set value that corresponds to the use-target image forming apparatus based on the set value identification information, identifies a set value alternative to the selected set value if there is no set value that corresponds to the selected set value.

6. The image forming system according to claim 5, wherein the use-target image forming apparatus or the information processing apparatus receives a decision or non-decision on the alternative set value as a set value to be set actually.

7. The image forming system according to claim 6, wherein the plurality of image forming apparatuses each include an operation display portion that displays information and receives an operation input; and the use-target image forming apparatus, when receiving the decision or non-decision on the alternative set value as the set value to be set actually, makes the operation display portion display the alternative set value in a visually identifiable manner.

8. The image forming system according to claim 5, wherein in a case where another image forming apparatus is added to the image forming system, the process portion of the information processing apparatus obtains information, which indicates a set item and a set value of the other image forming apparatus, from the other image forming apparatus and updates the set value identification information.

9. The image forming system according to claim 5, further comprising:

a mobile information terminal that is connected to the plurality of image forming apparatuses and the information processing apparatus in a communicating manner, wherein the mobile information terminal receives an instruction for selecting the set value to be set into the use-target image forming apparatus, and transmits information, which indicates the selected set value, to the information processing apparatus.

10. An image forming system, comprising:

a plurality of image forming apparatuses; and an information processing apparatus that is connected to the plurality of image forming apparatuses in a communicating manner and transmits setting information, which is for changing a current set value for a set item of a use-target image forming apparatus of the plurality of image forming apparatuses to a selected set value, to the use-target image forming apparatus, wherein the information processing apparatus includes:

a storage portion that stores set value identification information which is information indicating a corresponding relationship between respective set values for a set item of each of the plurality of image forming apparatuses, and used to identify a set value, which corresponds to the selected set value, from set values for the set item of the use-target image forming apparatus; and a process portion that in a case where a set value, which is used during a time of job execution by an image forming apparatus that is different from the use-target image forming apparatus, is selected as a set value to be set into the use-target image forming apparatus, based on the set value identification information, identifies a set value corresponding to the selected set value from the set values for the set item of the use-target image forming apparatus, and transmits information, which is for changing the current set value of the use-target image forming apparatus to the identified set value, to the use-target image forming apparatus as the setting information, wherein if job execution by means of the set value identified by the information processing apparatus is restricted in the use-target image forming apparatus, the use-target image forming apparatus or the information processing apparatus imparts that the job execution is restricted.

11. The image forming system according to claim 10, wherein in a case where another image forming apparatus is added to the image forming system, the process portion of the information processing apparatus obtains information, which indicates a set item and a set value of the other image forming apparatus, from the other image forming apparatus and updates the set value identification information.

12. The image forming system according to claim 10, further comprising:

a mobile information terminal that is connected to the plurality of image forming apparatuses and the information processing apparatus in a communicating manner, wherein the mobile information terminal receives an instruction for selecting the set value to be set into the use-target image forming apparatus, and transmits information, which indicates the selected set value, to the information processing apparatus.

* * * * *